INVENTORS
Johannes Kühr &
Heinz Weinbach

BY

ATTORNEY

United States Patent Office 3,535,199
Patented Oct. 20, 1970

3,535,199
FLAME-RESISTANT WOOD-CHIP PANELS CONTAINING FULLY HARDENED UREA FORMALDEHYDE AS FLAME RETARDANT
Johann Kühr, Harksheide, and Heinz Weinbach, Hamburg, Germany, assignors to Reichhold Chemicals, Inc., White Plains, N.Y.
Filed Sept. 21, 1967, Ser. No. 669,563
Claims priority, application Germany, Apr. 14, 1967,
R 34,942, R 45,769
Int. Cl. B32b 9/16, 21/02
U.S. Cl. 161—162                    4 Claims

ABSTRACT OF THE DISCLOSURE

The application discloses flame resistant chip board with an organic binder, which is characterized in that there is added to the adhesive-containing chip material 5 to 25% by weight of said chip material, of a powder-like fully hardened aminoplast in finely divided form, preferably having a particle size of 100% or less.

---

The present invention relates to an improved flame-resistant or flame-inhibiting wood-chip board or panel which is characterized in that it is particularly flame-resistant or flame-inhibiting and yet can be prepared by conventional methods. The production of chip boards is described in the book "Wood-Chip Board Materials" by Prof. Dr. Franz Kollman, Springer Verlag, Berlin/Heidelberg/New York 1966. It is only necessary to mix with the wood-chip material 5–25% by weight, based on the chip material, of a powdery fully hardened aminoplast in finely distributed form having a particle size of $100\mu$ or less. This mixture is then made into a wood-chip board by the usual methods. It has been found, as the result of fire tests, that it takes at least twice as long to burn through a chip board prepared in accordance with the present invention; the invention therefore provides boards of greatly superior properties. Chip boards having such flame-resistant or flame-inhibiting properties are of particular interest in ship construction, in the building of dwellings and prefabricated houses.

The powdery aminoplasts used in accordance with the present invention are, more particularly, condensation products of urea-formaldehyde which were subjected to complete hardening and drying and are available in a finely distributed form having a particle size of $100\mu$ or less. The preparation of these powder-like hardened aminoplasts can be carried out, for example, by curing an aqueous urea-formaldehyde resin with the aid of catalysts at room temperature or raised temperature, then reducing it to small pieces, drying at about 130–140° C. and finally comminuting to the desired particle size by grinding. However, it is also possible to treat liquid urea resins, upon addition of catalysts, in a spray drying device or in a drum drier. In that case, the hardening, drying and comminuting operations can be carried out all in one stage.

As the binder for the chip boards of the present invention, it is possible to use the usual organic binders having as a basis phenolic resins, urea resins or melamine resins. It is to be noted in this connection that the powder-like aminoplast added in accordance with the present invention, acts as an inert material during the bonding and pressing operations and does not, in any way, impair the mechanical properties of the chip board. A very substantial advance in the preparation of the new flame-resistant or flame-inhibiting chip boards is the fact that the organic binders ordinarily used for the manufacture of chip boards, need not be modified or increased. Moreover, it is possible to use the powdered or powder-like aminoplast, in accordance with the present invention, in a simple manner without any noteworthy changes in the usual technological processes for the manufacture of chip boards. According to the comparative tests and examples, a chip board containing 10% urea resin which, as practiced at present, was added as the soluble binder, upon curing as above described does not show lengthening of the burning out period compared to a chip board prepared for example with a phenolic resin binder. In contrast to this, a chip board prepared in accordance with the present invention, i.e. a chip board containing aminoplast in the form of an otherwise inert filler having a particle size of $100\mu$ or less, showed a substantially lengthened burning out period. The action of the fully hardened powder-like urea resin contained in the chip board, in the form described in the present invention, is therefore surprising and clearly constitutes an important technical advance.

Three-layered chip board panels were prepared for the examples and comparative tests. In these panels, the relative proportions are about 35% by weight for the two outer or covering layers and about 65% by weight for the middle layer. The thickness of the panels was uniformly kept at 20 mm., the gross density lying between 640 and 660 kg./m.3.

COMPARATIVE TEST 1

Chip board with urea resin binder:
Covering layer:
    10% urea resin (absolute dryness) per wood chip material (absolute dryness) 0.5% paraffin wax emulsion (absolute dryness) per wood chip material (absolute dryness)
Middle layer:
    8% urea resin
    0.5% paraffin wax emulsion
    0.5% paraffin wax emulsion (absolute dryness) per wood chip material (absolute dryness

COMPARATIVE TEST 2

Chip board with phenolic resin binder:
Covering layer:
    10% phenolic resin (absolute dryness) per wood chip material (absolute dryness)
    0.5% paraffin wax emulsion (absolute dryness) per wood chip material (absolute dryness)
Middle layer:
    8% phenolic resin (absolute dryness) per wood chip material (absolute dryness)
    0.5% paraffin wax emulsion (absolute dryness) per wood chip material (absolute dryness)

Example 1

Addition of 10% powder-like aminoplast to the covering layer in accordance with the present invention.

A chip board was prepared exactly as described in comparative Test 2, using in the covering layer instead of pure wood chips, a mixture of 90 parts by weight of wood chips and 10 parts by weight of powder-like fully hardened urea resin.

Example 2

A chip board was prepared exactly as described in comparative Test 2 using in the covering layer as well as in the middle layer, instead of pure wood chips, a mixture of 90 parts by weight of wood chips and 10 parts by weight of powder-like fully hardened urea resin.

BURNING TEST

Chip boards cut to a size of about 25 x 50 cm., were placed in vertical position and subjected to a Teclu-burner flame having a length of about 18 cm. and a flaming cone about 5 cm. long. The distance between the burner opening and the chip board amounted to 13 cm. The axis of the burner tube was seen to be perpendicular to the surface of the panel. Measurements were made of the time beginning with the flame projection to the first formation of cracks passing through panel, i.e. visible also at the back side thereof. The evaluation of the comparative tests gave the following results:

Comparative test 1

| | Mins. |
|---|---|
| Chip board with urea resin binder | 30 |

Comparative test 2

| | |
|---|---|
| Chip board with phenolic resin binder | 28 |

Example 1

| | |
|---|---|
| Both covering layers treated in accordance with the present invention | 58 |

Example 2

| | |
|---|---|
| Entire cross-section of panel, i.e. both covering layers and middle layer treated in accordance with the present invention | 76 |

The chip board obtained in accordance with the present invention is exemplified in the accompanying drawings in which FIG. 1 shows through a muli-layered flately molded chip board according to the invention, wherein covering layers 1 and the middle layer 2 are provided with the powder-like fully hardened aminoplast 3 in finely distributed form.

Figure 1:
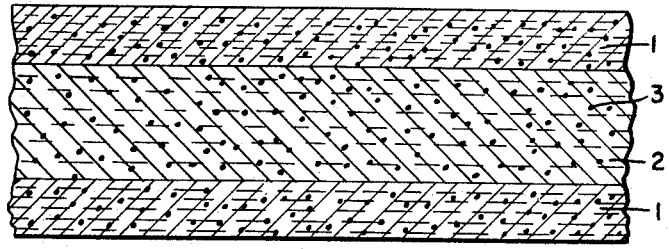
Figure 2:
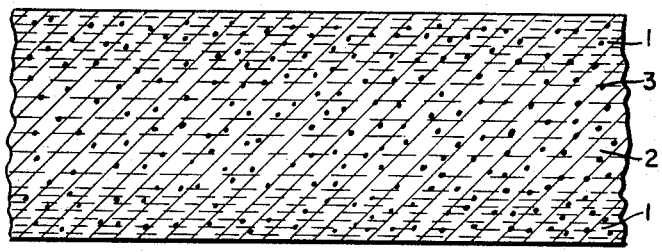
FIG. 2 shows a section through a single layer chip board prepared by the same molding process wherein all the layers merge into each other, i.e. without being separated, and wherein the powder-like fully hardened aminoplast 3 is, therefore, present throughout the entire cross-section in a finely distributed form.
Figure 3:
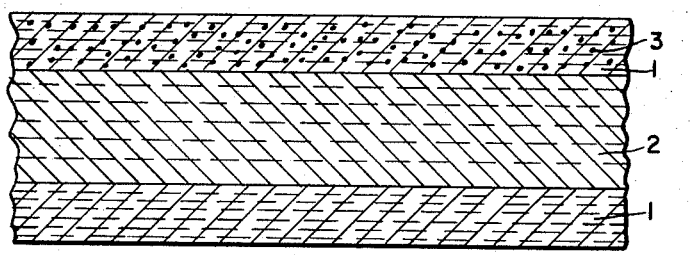
FIG. 3 shows a section through a multilayered chip plate prepared by the same molding process wherein only one covering layer contains the powder-like fully hardened aminoplast 3.
Figure 4:
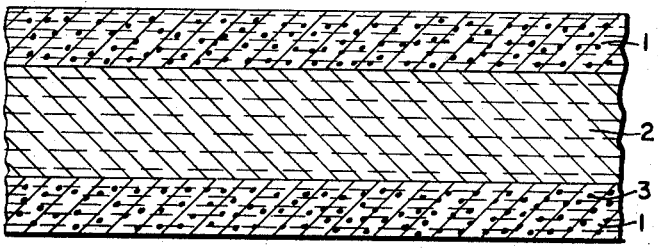
FIG. 4 shows a section through a multi-layered chip board prepared by the same molding process wherein both covering layers contain the powder-like fully hardened aminoplast 3.

The preparation and use of aminoplasts and, more particularly, urea resins are described in "Ullumann's Enzyklopädie der technischem Chemie" 1953, vol. 3, pp. 475–495.

The powder-like fully hardened aminoplast material having as a basis condensation products of urea and formaldehyde indicated in the drawings by the numeral 3, was prepared as follows:

1150 grams of 37% formaldehyde, containing methanol, was adjusted with sodium hydroxide to a pH value of 7.0–7.2. 450 grams of urea were added to this solution at room temperature and caused to dissolve in the formaldehyde at 30° C. The mixture is held at a temperature of 90° C. and at a pH of 7.3–7.5 until the resin becomes cloudy at 50° C. As soon as the turbidity point has been reached, the pH value is adjusted with formic acid to 5.6–5.7. The mixture is held at 90° C. until the directly measured Gardner viscosity is about B. Upon reaching B viscosity the mixture is cooled and 6.2 grams triethanolamine and 0.16 gram of sodium thiosulfate dissolved in 0.65 gram of water and 0.56 gram of dibutylphthalate are added.

The pH value is now the order of 7.7–7.9 and, if necessary, this pH value can be adjusted with formic acid or sodium hydroxide.

Preparation of the hardener

| | Parts by wt. |
|---|---|
| Urea | 12 |
| Hexamethylenetetramine | 22 |
| Ammonium chloride | 12 |
| Water | 57 |

Prior to spray drying, the resin is mixed with 10% of the hardener and is thereupon fully cured at temperatures of about 80–100° C.

The invention has been described in detail for the purpose of illustration, but it will be obvious that numerous modifications and variations may be resorted to within the scope of the appended claims without departing from the spirit of the invention.

We claim:
1. A flame resistant flatly molded chipboard, consisting essentially of (A) wood chips, (B) an adhesive selected from the class of phenolic formaldehyde resins, urea formaldehyde resins and melamine formaldehyde resins and (C) a powder-like fully hardened urea-formaldehyde resinous condensation product; the particle size of said urea-formaldehyde condensation product being not greater than about 100 microns and the quantity of said urea-formaldehyde condensation product ranging from about 5% to about 25% based on the combined weight of said wooden chips (A) and said adhesive (B).

2. A flame resistant multilayered chipboard according to claim 1 wherein the amount of component (C) used is 10% based upon the combined weight of components (A) and (B).

3. A flame resistant flately molded chipboard according to claim 1, wherein the chipboard is multilayered and wherein component (C) is contained in at least one covering layer.

4. A flame resistant flately molded chipboard according to claim 1, wherein the chipboard is multilayered and wherein component (C) is contained in both covering layers.

References Cited

UNITED STATES PATENTS

| 2,452,054 | 10/1948 | Jones et al. | 260—840 XR |
| 2,488,034 | 11/1949 | Pingree et al. | 161—403 XR |
| 2,509,642 | 5/1950 | Horsak | 161—162 XR |
| 2,518,963 | 8/1950 | Weaver. | |
| 2,684,953 | 7/1954 | Stilbert et al. | 260—17.3 |
| 2,690,100 | 9/1954 | McGarvey | 161—403 XR |
| 3,138,565 | 6/1964 | Rosenberger et al. | 260—17.3 |
| 3,352,744 | 11/1967 | Elmer et al. | 161—403 XR |

FOREIGN PATENTS

| 569,891 | 2/1959 | Canada. |

JOHN T. GOOLKASIAN, Primary Examiner

G. W. MOXON II, Assistant Examiner

U.S. Cl. X.R.

161—168, 403; 260—69, 840